United States Patent
Wu et al.

(10) Patent No.: US 8,612,518 B2
(45) Date of Patent: Dec. 17, 2013

(54) DUAL SCREEN PC

(75) Inventors: Chun-Ting Wu, Taipei County (CN); Chen-Pang Chuang, Taipei County (CN)

(73) Assignee: Maples Corporate Services Limited, Georgetown (KY)

( * ) Notice: Subject to any disclaimer, the term of this patent is extended or adjusted under 35 U.S.C. 154(b) by 404 days.

(21) Appl. No.: 12/947,588

(22) Filed: Nov. 16, 2010

(65) Prior Publication Data

US 2012/0124648 A1    May 17, 2012

(51) Int. Cl.
*G06F 15/16*    (2006.01)

(52) U.S. Cl.
USPC .......................................... 709/204; 709/229

(58) Field of Classification Search
USPC ......... 709/204, 208–211, 206, 225, 227–230; 707/966–974, 999.01; 715/733–759
See application file for complete search history.

(56) References Cited

U.S. PATENT DOCUMENTS

| | | | |
|---|---|---|---|
| 5,590,021 A | 12/1996 | Register | |
| 5,903,894 A * | 5/1999 | Reneris | 1/1 |
| 6,222,507 B1 | 4/2001 | Gouko | |
| 6,302,612 B1 | 10/2001 | Fowler | |
| 6,532,146 B1 | 3/2003 | Duquette | |
| 6,667,877 B2 | 12/2003 | Duquette | |
| 6,667,878 B2 | 12/2003 | Ponx | |
| 6,690,585 B2 | 2/2004 | Betts-La Croix | |
| 6,928,464 B2 * | 8/2005 | Appiah et al. | 709/204 |
| 6,991,350 B2 | 1/2006 | McInnis | |
| 7,054,963 B2 | 5/2006 | Betts-La Croix | |
| 7,054,965 B2 | 5/2006 | Bell et al. | |
| D524,809 S | 7/2006 | Alcouloumre et al. | |
| 7,247,032 B2 | 7/2007 | Merz | |
| 7,249,873 B2 | 7/2007 | Tiesler et al. | |
| 7,274,355 B2 | 9/2007 | Betts-La Croix et al. | |
| 7,285,021 B2 | 10/2007 | Bell et al. | |
| 7,352,332 B1 | 4/2008 | Betts-La Croix et al. | |
| 7,353,053 B2 | 4/2008 | Prichard et al. | |
| 7,357,648 B2 | 4/2008 | Merz | |
| 7,372,454 B2 | 5/2008 | Betts-La Croix | |
| 7,390,197 B2 | 6/2008 | Merz | |
| D579,451 S | 10/2008 | Ward et al. | |
| D581,935 S | 12/2008 | Merz | |
| 7,462,073 B2 | 12/2008 | Bell et al. | |
| 7,493,500 B2 | 2/2009 | Chin et al. | |
| 7,518,860 B2 | 4/2009 | Chin et al. | |
| 7,537,485 B2 | 5/2009 | Bell et al. | |
| 7,572,021 B2 | 8/2009 | Sawada et al. | |
| D602,938 S | 10/2009 | Ward et al. | |
| 7,765,326 B2 * | 7/2010 | Robbin et al. | 709/248 |
| 7,794,113 B2 | 9/2010 | Lee | |

(Continued)

FOREIGN PATENT DOCUMENTS

WO    2010021626 A1    2/2010

*Primary Examiner* — Ruolei Zong
(74) *Attorney, Agent, or Firm* — Haverstock & Owens LLP

(57) ABSTRACT

Systems for, and methods of, enabling selective control of resource of an electronic device having a display by a controlling electronic device having a display are disclosed. Selective control of the electronic device is implemented by the electronic device via a set of control permissions for a detected controlling device, based upon an identifier of the controlling device. A controlling device can be any electronic device having a processor, a memory, a display and a communication module. Enabling selective control of the display of an electronic device having a display, by a personal computer, enables the personal computer to operate as a dual screen personal computer.

25 Claims, 10 Drawing Sheets

(56) References Cited

U.S. PATENT DOCUMENTS

| | | |
|---|---|---|
| 7,810,222 B2 | 10/2010 | Ward et al. |
| D628,199 S | 11/2010 | Yukikado et al. |
| D630,628 S | 1/2011 | Kovac |
| 7,991,442 B2 | 8/2011 | Kim |
| 8,111,040 B2 * | 2/2012 | Guthrie et al. ............. 320/107 |
| 8,353,048 B1 * | 1/2013 | Werner et al. ............... 726/27 |
| 2001/0043188 A1 | 11/2001 | Nakamura |
| 2003/0202339 A1 | 10/2003 | Oross et al. |
| 2005/0289266 A1 | 12/2005 | Illowsky et al. |
| 2006/0188096 A1 * | 8/2006 | Aguilar ........................ 380/200 |
| 2006/0224620 A1 * | 10/2006 | Silverman et al. ......... 707/104.1 |
| 2007/0024588 A1 | 2/2007 | Yin et al. |
| 2007/0124372 A1 * | 5/2007 | Liu et al. .................... 709/204 |
| 2008/0180391 A1 * | 7/2008 | Auciello et al. ............ 345/156 |
| 2008/0266865 A1 | 10/2008 | Lev et al. |
| 2009/0109649 A1 | 4/2009 | Harris et al. |
| 2009/0122474 A1 | 5/2009 | Mickey et al. |
| 2009/0166493 A1 | 7/2009 | Lee |
| 2009/0220216 A1 * | 9/2009 | Marsh et al. ................ 386/124 |
| 2009/0268401 A1 | 10/2009 | Krah |
| 2010/0042671 A1 * | 2/2010 | Natt et al. ................... 709/203 |
| 2010/0124006 A1 | 5/2010 | Chang |

* cited by examiner

DUAL SCREEN PC

FIELD OF THE INVENTION

The present invention relates to the field of electronic devices having a display screen. More specifically, the present invention relates to systems for and methods of enabling selective control of an electronic device having a display screen by a second electronic device having a display screen.

BACKGROUND OF THE INVENTION

Many consumers own several electronic devices, each of which includes a processor, a display, a memory, and a communication module for communicating with other electronic devices. Such electronic devices can include a digital picture frame, a cell phone, a Smart Phone, a digital music player, a digital camera, a digital camcorder, an electronic book reader (e-book), a display panel with a processor and a memory, a personal digital assistant (PDA), a pocket personal computer (PC), a tablet PC, a laptop PC, a notebook PC, and a desktop PC. Most of these also have an input device and audio processing capabilities.

Current electronic devices have only limited ability to inter-operate with other electronic devices. Interoperability, if any, between devices is largely application-specific. For example, a desktop PC running Microsoft® Outlook® can interoperate with certain PDA's, such as the Hewlett-Packard® Pocket PC, to synchronize mail folders, contacts, tasks and other data. In a synchronization operation, the desktop PC is a controlling device and the Pocket PC is a controlled device. An application on the desktop PC, Microsoft® ActiveSync®, allows the user to specify which data will be synchronized, and the method of synchronization. The Pocket PC has a corresponding ActiveSync® agent which responds to the requests by ActiveSync® on the desktop PC. The ActiveSync® agent on the Pocket PC permits configuration of some parameters of the synchronization process. There is no permission set on the Pocket PC, associated with an identifier of the desktop PC, permitting the desktop PC to control the display of the Pocket PC independent of the ActiveSync® application. Other software tools, similar to ActiveSync®, exist for synchronizing music between a desktop PC and a digital music player, and for backing up contact information on a cell phone to a server. Synchronization applications do not enable an electronic device to specify a set of control permissions characterizing the control that the electronic device will permit to a detected and identified controlling device, independent of the synchronization application.

Current electronic devices do not enable selective control of a resource on the electronic device, by a controlling electronic device, according to a set of control permissions associated with an identifier of the controlling device, and independent of a specific software application.

SUMMARY OF THE INVENTION

Embodiments of the presently-claimed invention are directed to systems for and methods of enabling an electronic device having a display to be selectively controllable by a controlling electronic device having a display. In the description which follows, inter-operation of devices will be described between only two devices. One skilled in the art, in possession of this disclosure, will recognize that a plurality of devices can be inter-operated in accordance with the teachings in the disclosure.

In a first aspect, a method of enabling selective control of a resource of an electronic device having a display comprises implementing, by the electronic device, a set of control permissions for a detected controlling device having a display, based on an identifier of the controlling device. A resource can be a video resource, an audio resource, an input resource or a charging resource. In some embodiments, a video resource is the display on the electronic device, and the set of control permissions enables the controlling device to control the display on the electronic device. In some embodiments, the electronic device comprises a charging resource, and the set of control permissions enables the controlling device to control the charging of the controlling device by the charging resource on the electronic device. A set of control permissions can comprise permission to exclusively control a resource, to share a resource, or to deny control of a resource to an identified controlling device. In some embodiments, a user of an electronic device can define the set of control permissions for an identified controlling device. The set of control permissions can be stored on, and retrieved from, the electronic device or another electronic device accessible to the electronic device. In some embodiments, another electronic device can be a controlling electronic device. Enabling of selective control of a resource can be independent of an application running on the controlling device. In some embodiments, a plurality of sets of control permissions are associated with an identifier of the controlling device. A set of control permissions can correspond to a selective control mode. A selective control mode can be, but is not limited to, an audio mode, a video mode, an audio-video mode, an input mode, or a charging mode. In some embodiments, a selective control mode can be associated with the identifier of the controlling device such that the selective control mode is implemented when the controlling device is detected and identified. For example, an audio-video selective control mode can be associated with an identifier corresponding to a particular controlling desktop computer, such that the desktop computer is able to control the display and audio resources of the electronic device in accordance with the set of control permissions associated with the identifier of the desktop computer. In some embodiments, a controlling device is detected and identified a first time during a coupling of the electronic device with the controlling device. Thereafter, the electronic device can detect and identify the controlling device without coupling the electronic device with the controlling device. In some embodiments, selective control of the electronic device can be terminated by the electronic device.

In a second aspect, a computer-readable medium is programmed with instructions implementing a method of enabling, by an electronic device having a display, selective control of a resource of the electronic device comprising implementing, by the electronic device, a set of control permissions for a detected controlling device based on an identifier of the controlling device.

In a third aspect, an electronic device comprises a processor, a display, an input device, a communications module, and a computer-readable medium programmed with instructions for enabling selective control of a resource of the electronic device by implementing a set of control permissions for a detected controlling device having a display, based on an identifier of the controlling device. In some embodiments, the electronic device further comprises means for coupling the electronic device to a controlling device. The means for coupling can comprise means for detecting the controlling device. The means for coupling can further comprise means for identifying the controlling device. In some embodiments, the electronic device further comprises a rechargeable power source. In some embodiments, the means for coupling can further comprise a means for charging a rechargeable power source.

If a fourth aspect, a system comprises a first electronic device including a processor, a display, a communication module, an input device, and a memory programmed with instructions implementing a method of enabling, by the first electronic device, selective control of a resource of the first electronic device by a second electronic device in accordance with a set of control permissions associated with an identifier of the second electronic device. The system further comprises a second electronic device including a processor, a display, a communication module, an input device, a memory, and an identifier. The system also comprises means for the first electronic device to detect the presence of the second electronic device and to retrieve the identifier of the second electronic device, and means for the first electronic device to retrieve a set of control permissions associated with the identifier of the second electronic device. In some embodiments, the first electronic device and the second electronic device can each operate independently from the other. In some embodiments, the first electronic device is a tablet computer, the second electronic device is a desktop computer, detected and identified by the tablet computer, and the tablet computer implements a set of control permissions enabling selective control of the tablet computer display by the desktop computer. In some embodiments, the set of control permissions further enables selective control of the tablet computer audio by the desktop computer. In some embodiments, the first electronic device can comprise a means for charging the second device, and the set of control permissions enable the second device to selectively control the means for charging.

DETAILED DESCRIPTION OF THE DRAWINGS

The systems and methods described herein enable selective control of a resource of an electronic device having a display. The selective control is implemented by the electronic device via a set of control permissions for a detected controlling device, based on an identifier of the controlling device.

The following figures illustrate features of specific embodiments of the presently-claimed invention. Throughout the figures, below, identical labels refer to identical or similar elements. The following embodiments are intended to illustrate the features of the presently-claimed invention. The invention is not limited to only the disclosed embodiments.

Figure 1:
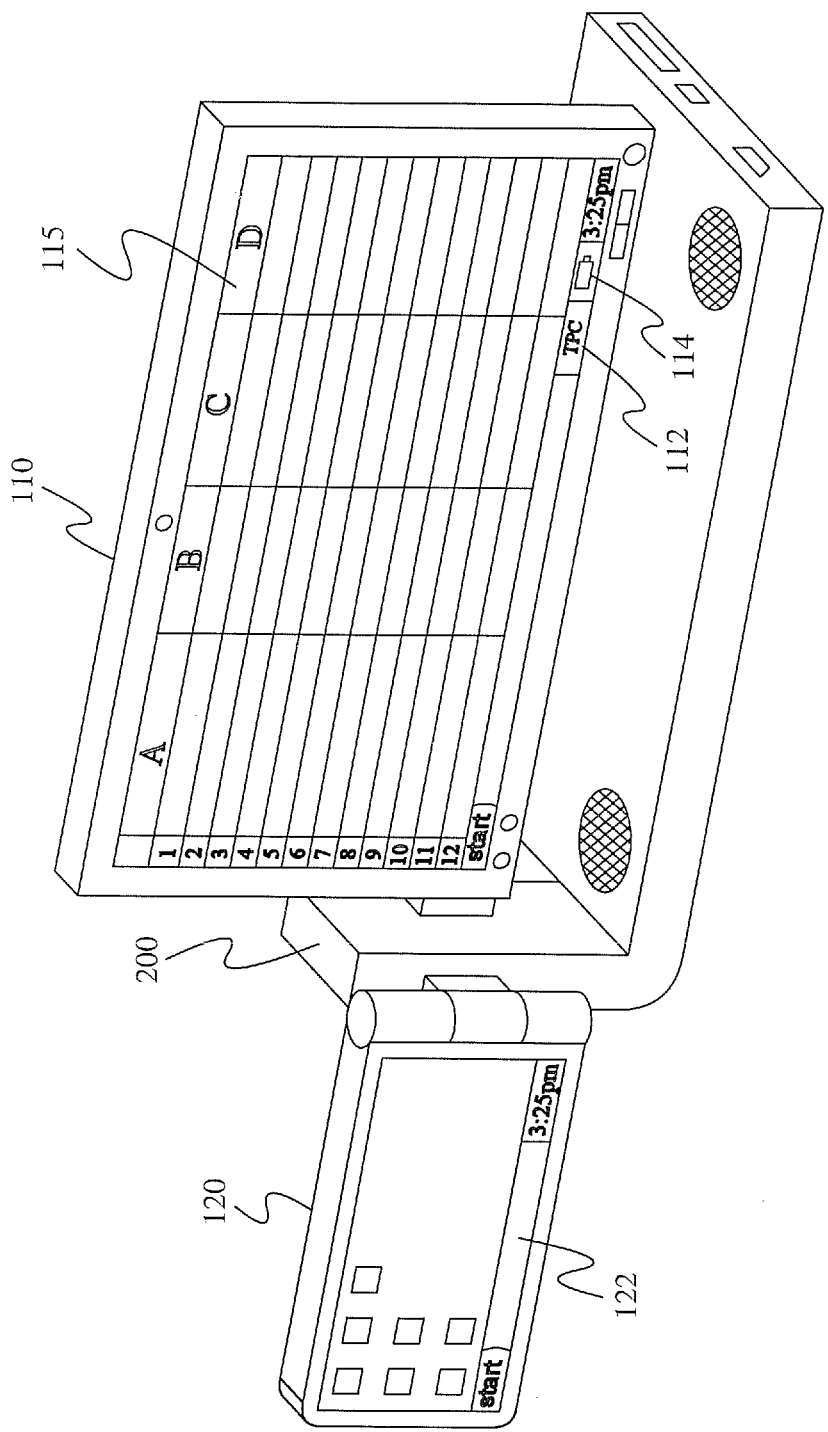
FIG. 1 shows a tablet PC coupled by a mount to a desktop PC, according to some embodiments.

FIG. 1 shows a desktop PC 110 coupled by a mount 200 to a tablet PC 120. As shown in FIGS. 6A-6D, below, the mount 200 can comprise means for detecting the coupling of the tablet PC 120 with the desktop PC 110, and can further comprise means for charging the tablet PC 120. In this embodiment, the desktop PC is an electronic device having a display, enabling selective control of the charging resource in the mount by the tablet PC. The desktop PC 110 detects the presence of tablet PC 120 and displays an icon 112 on the desktop PC display 115 indicating that the tablet PC 120 has been detected and identified, and that a set of control permissions has been retrieved and implemented on the desktop PC 110. The set of control permissions on the desktop PC 110 enable selective control of the charging means in the mount 200 by the tablet PC 120. An icon 114 on the desktop PC display 115 indicates that the tablet PC 120 can selectively control the charging function on the desktop PC 110. When the tablet PC 120 reaches full charge, the tablet PC 120 can turn off the charging function of the desktop PC 110. When the charging function is turned off, the icon 114 can be removed from the desktop PC display 115, or the color of the icon 114 can change to indicate that the charging function is turned off. In this embodiment, the desktop PC 110 and the tablet PC 120 are independently operable, other than the charging function described above. Thus the tablet PC display 122 is under control of the tablet PC 120, and the desktop PC display 115 is under control of the desktop PC 110. The desktop PC 110 is running a spreadsheet application, and the tablet PC 120 is at the start menu with no application open or running.

Figure 2:
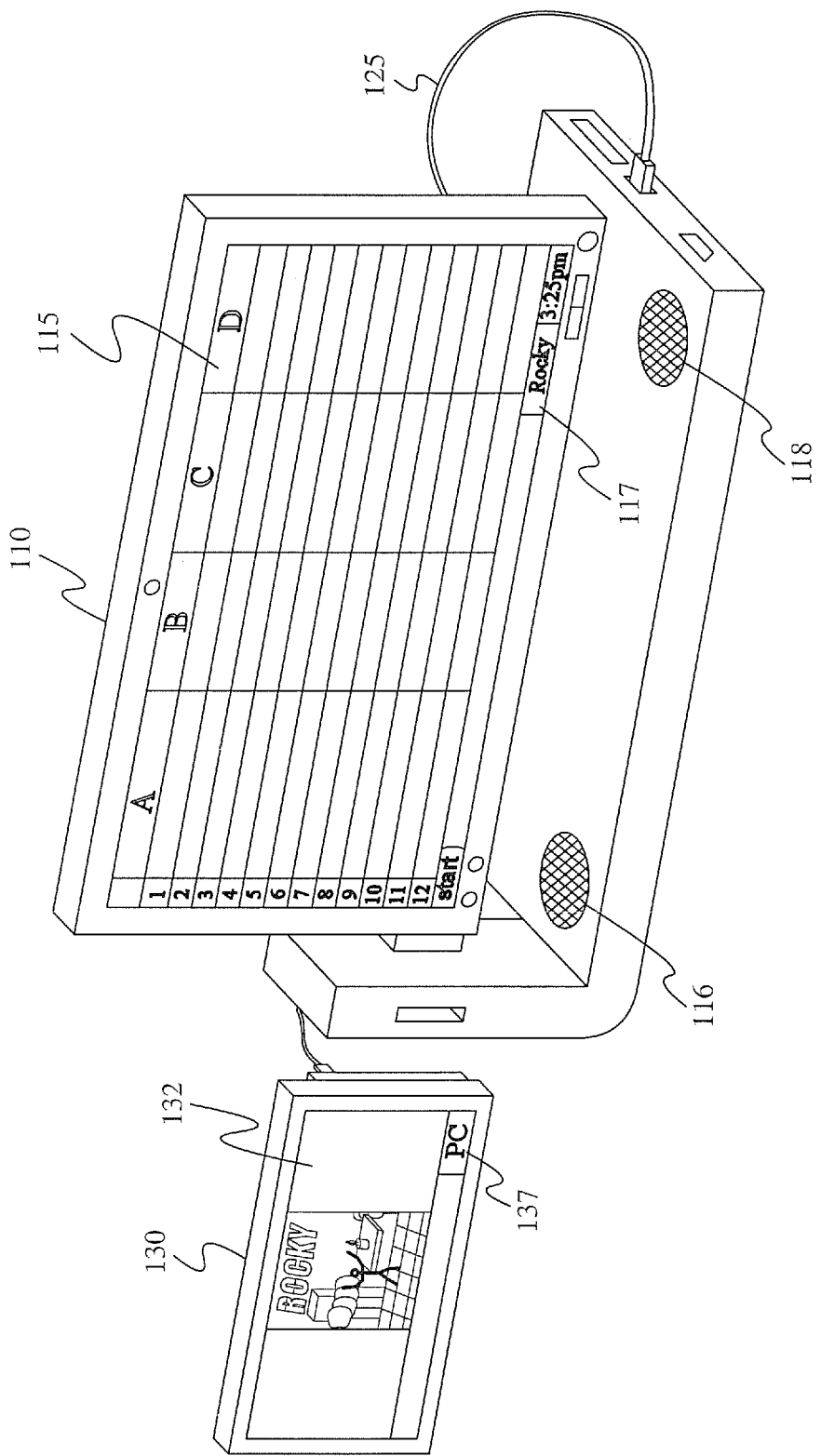
FIG. 2 shows a digital picture frame coupled to a desktop PC, according to some embodiments.

FIG. 2 shows the desktop PC 110 coupled to a digital picture frame 130 using a USB cable 125. The digital picture frame display 132 shows an icon 137 titled "PC" indicating that the desktop PC 110 has been detected and identified by the digital picture frame 130, and that the digital picture frame 130 has retrieved and implemented a set of control permissions enabling selective control of a resource on the digital picture frame 130 by the desktop PC 110. In this embodiment, the digital picture frame 130 does not support audio. Accordingly, the set of control permissions on the digital picture frame 130 associated with an identifier of the desktop PC 110 does not permit control of the digital picture frame audio resources because the digital picture frame 130 does not support audio. The digital picture frame 130 operates as a second display of the desktop PC 110. The desktop PC 110 is running a spreadsheet application as shown on the desktop PC display 115. The desktop PC is also streaming the video of "Rocky" to the digital picture frame screen 132 as shown by icon "Rocky" 117. The soundtrack for the movie Rocky is played over the desktop PC speakers 116 and 118 because the digital picture frame does not support audio. Control of the digital picture frame 130 by the desktop PC 110 can be terminated by any of: powering off the digital picture frame 130, powering off the PC 110, ending the application showing the movie, the digital picture frame 130 terminating the permission for the desktop PC 110 to control the display 132 of the digital picture frame 130, or by disconnecting the USB cable 125, thereby decoupling the desktop PC 110 from the digital picture frame 130.

Figure 3:
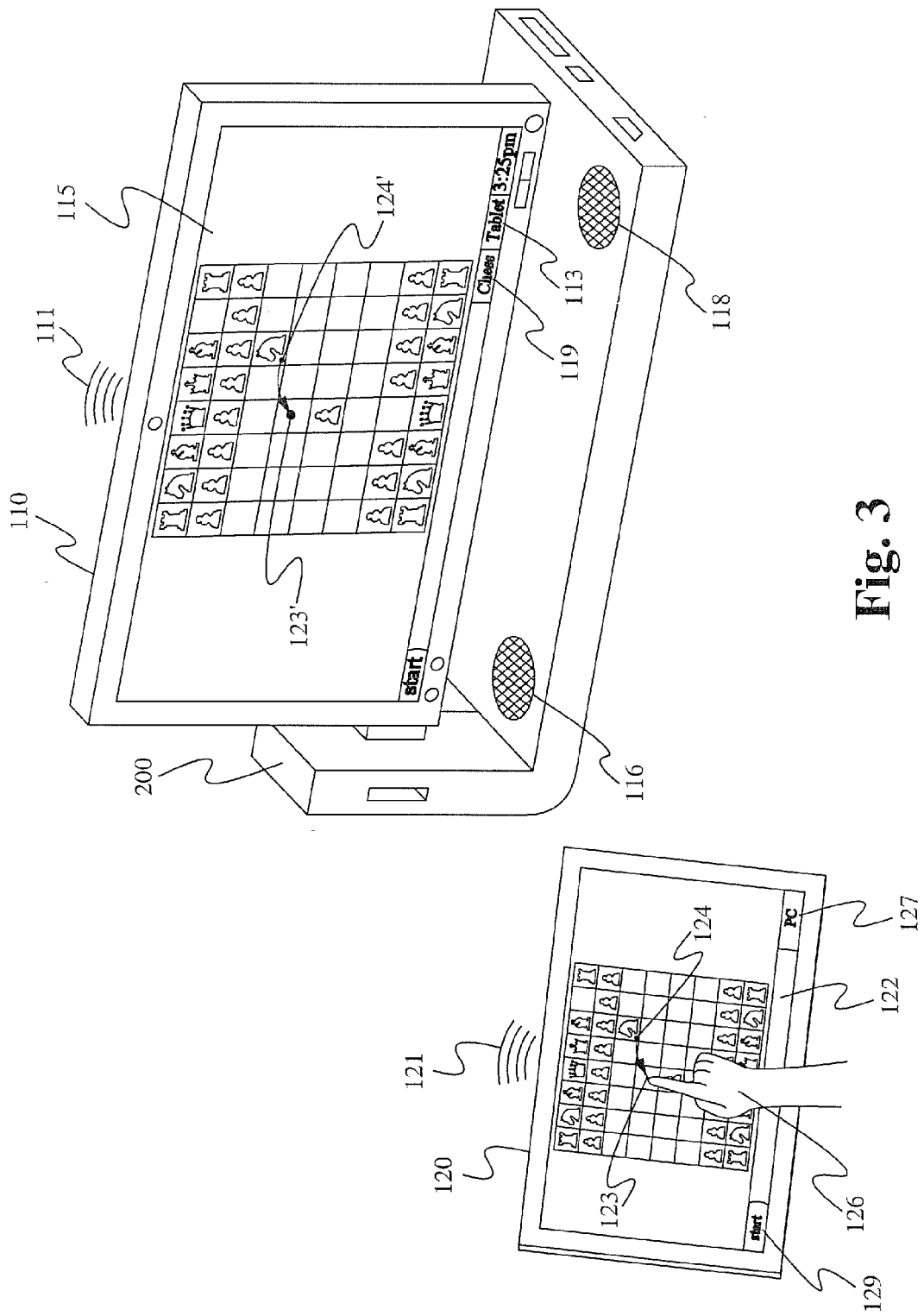
FIG. 3 shows a tablet PC communicatively coupled to desktop PC, according to some embodiments.

FIG. 3 shows the desktop PC 110 having a wireless communication adapter 111 in communication with a tablet PC 120 having a wireless communication adapter 121. In this embodiment, the desktop PC 110 permits the tablet PC 120 to control the desktop PC inputs. The tablet PC 120 permits the desktop PC 110 to control the tablet PC display. An icon 113 "Tablet" on the desktop PC display 115 indicates that the desktop PC 110 has enabled selective control of a resource on the desktop PC 110 by the tablet PC 120. The icon "PC" 127 on the tablet PC display 122 indicates that the tablet PC 120 has enabled selective control over a resource on the tablet PC 120 by the desktop PC 110. The desktop PC 110 has permitted the tablet PC 120 to control the desktop PC 110 inputs. The tablet PC 120 effectively becomes a remote controller of the desktop PC 110. The desktop PC 110 is running a chess game application as shown on the desktop PC display 115 and the icon "Chess" 119 on the desktop PC display 115. A user of the tablet PC 120 moves a chess piece by touching the tablet PC display 122 with their finger 126 and dragging the chess piece from a location 124 to a new location 123. The desktop PC 110 processes the input and updates the location of the chess piece from a corresponding location 124' to the new corresponding location 123' on the desktop PC display 115. The desktop PC 110 then updates the tablet PC display 122, thereby making the tablet PC 120 operate as a remote controller of the chess game on the desktop PC 110. As indicated by the lack of a chess game icon in the task bar 129 of the tablet PC 120, the chess game is not running on the tablet PC 120. The tablet PC 120 is controlling the inputs to the chess game as the chess game runs on the desktop PC 110.

Figure 4:
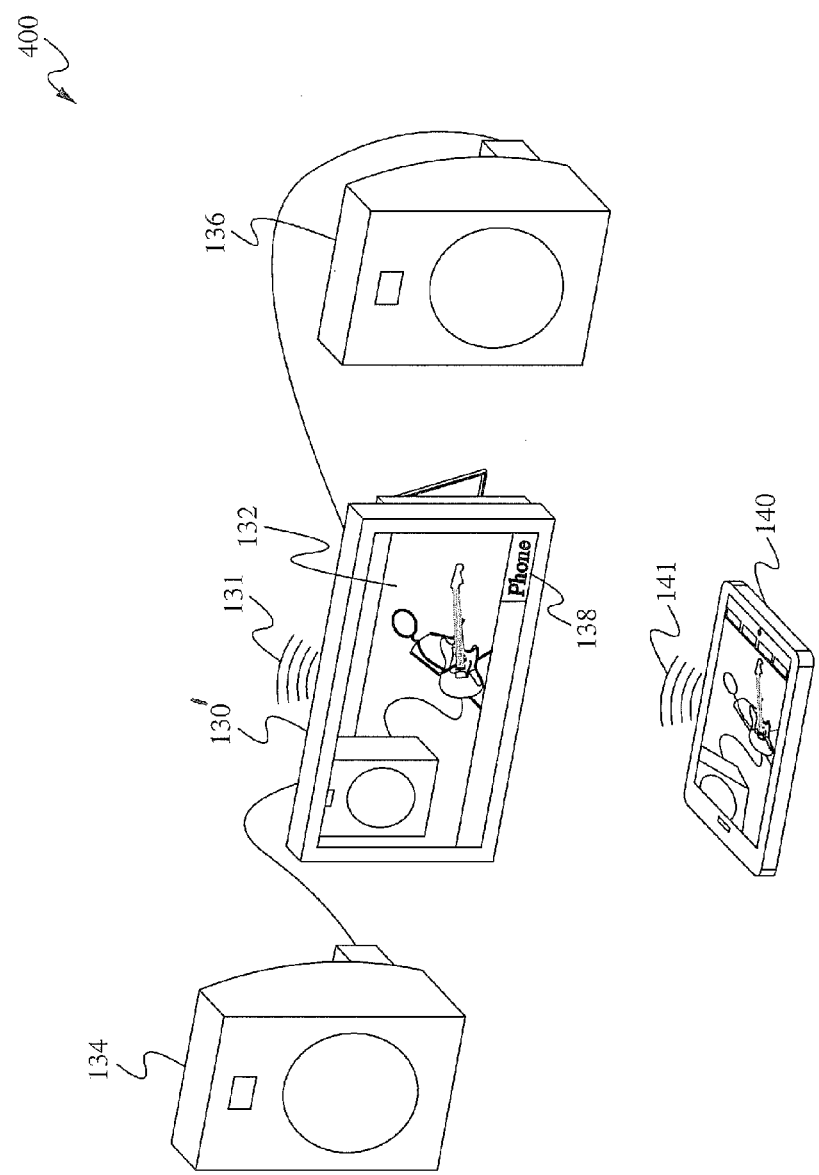
FIG. 4 shows a digital picture frame having audio and external speakers, communicatively coupled to a Smart Phone, according to some embodiments.

FIG. 4 shows a Smart Phone 140 with a wireless adapter 141 communicatively coupled to the digital picture frame 130' having a wireless adapter 131 and audio capabilities for driving speakers 134 and 136. The digital picture frame 130' has detected and identified the Smart Phone 140 and implemented a set of control permissions for enabling the Smart Phone 140 to selectively control the digital picture frame display 132 and the digital picture frame audio to drive speakers 134 and 136. An icon 138 "Phone" on the digital picture frame display 132 indicates that one or more resources on the digital picture frame 130' can be controlled by the Smart Phone 140. A user is playing a music video on the Smart Phone 140. The music video is displayed on the digital picture frame screen 132 and the audio is played over the speakers 134 and 136. The Smart Phone 140 can be configured to simultaneously display the video and play the audio on the Smart Phone 140 and on the digital picture frame 130', thereby creating a dual screen Smart Phone. Alternatively, the Smart Phone 140 can operate independently of the music video being played on the digital picture frame 130'.

Figure 5:
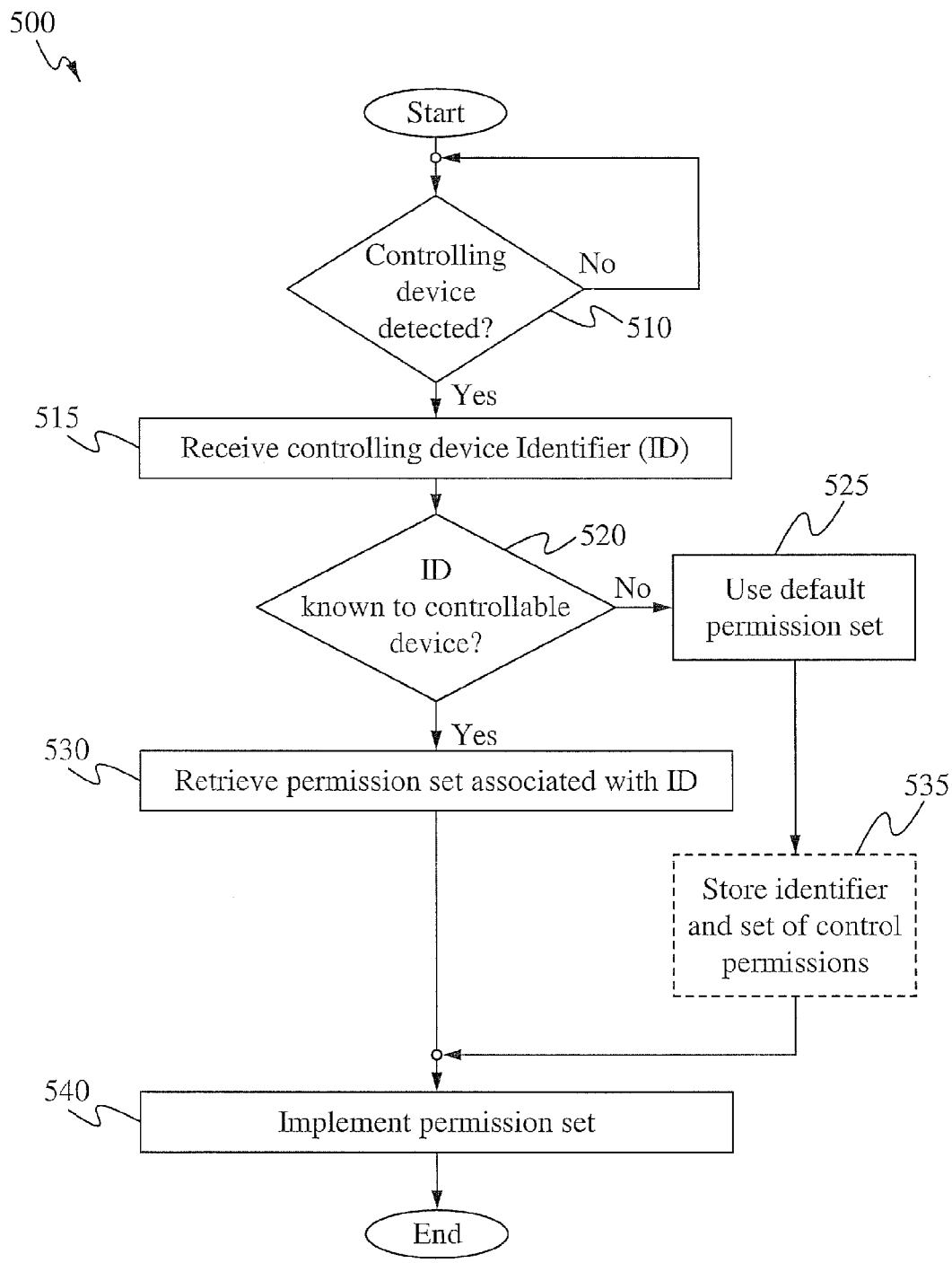
FIG. 5 illustrates a method of selectively enabling control of a controllable device according to some embodiments.

FIG. 5 is a method 500 of enabling control of a controllable device according to some embodiments. At step 510, a controllable device checks to see whether a potential controlling device is detected. If a controlling device is detected, at step 515 the controllable device receives an identifier of the controlling device. If no controlling device is detected, the method loops back to continue checking for the presence of a controlling device at step 510. After an identifier of the controlling device is received at step 515, the identifier is looked up by the controllable device at step 520 to determine whether the identifier is known to the controllable device. If the identifier is known, then at step 530 the controllable device retrieves a set of control permissions associated with the identifier. If the identifier is not known, then at step 525 a default set of control permissions is created. At step 535, the method can optionally store the identifier and default set of control permissions associated with the identifier in order to keep a log of an attempt by an unknown device to access the controllable device. At step 540 the set of control permissions is implemented and the method ends.

Figure 6A:
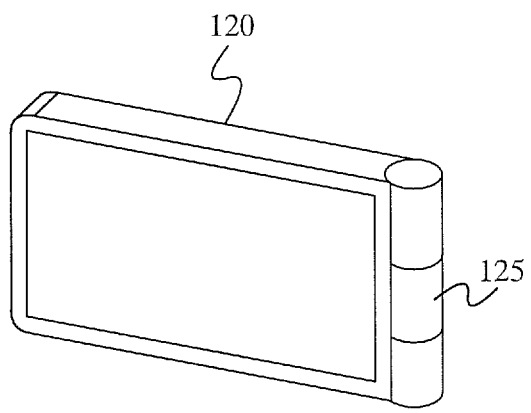
FIG. 6A shows a front view of a mountable, independently operable tablet PC according to some embodiments.
Figure 6B:
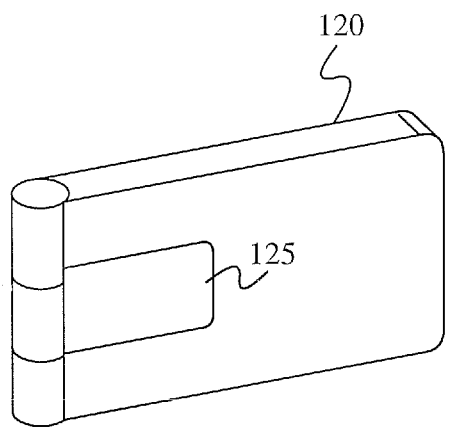
FIG. 6B shows a rear view of the tablet PC of FIG. 6A with the mount in its stored position, according to some embodiments.
Figure 6C:
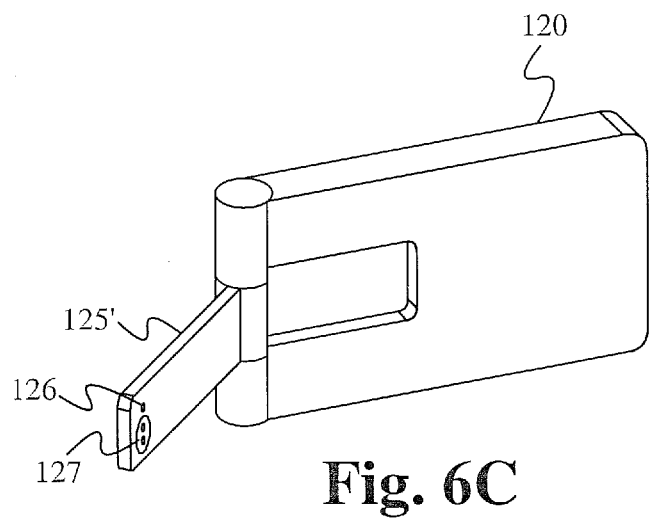
FIG. 6C shows a rear view of the tablet PC of FIG. 6A with the mount in its open position, according to some embodiments.
Figure 6D:
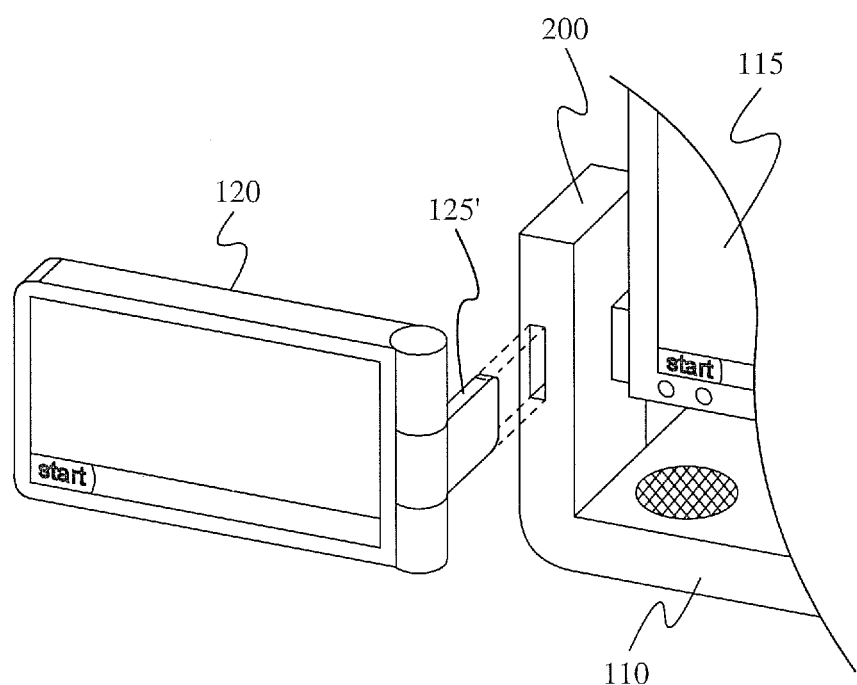
FIG. 6D shows a front view of the tablet PC of FIG. 6A being mounted into a mount on a desktop PC according to some embodiments.

FIGS. 6A-6D illustrate a mountable, independently operable tablet PC 120 having pins for mount detection 126 and charging 127. FIG. 6A shows a front view of a mountable, independently operable tablet PC 120 with the mount 125 in its stored position. FIG. 6B shows a rear view of the tablet PC 120 with the mount 125 in its stored position. FIG. 6C shows another rear view of the tablet PC 120 with the mount 125' in its open position. The mount 125' comprises a mounting detection pin 126. When the tablet PC 120 is mounted to a desktop PC 110, as shown in FIG. 6D, the mounting detection pin 126 contacts a corresponding pad inside the desktop PC mount 200. Detection of the presence of tablet PC 120 by the desktop PC 110, and detection of the presence of the desktop PC 110 by the tablet PC 120 can be sensed by the contact between the pin 126 and a corresponding contact inside the mount 200. In some embodiments, the mount 125' comprises charging pins 127, which have corresponding pads inside the mount 200 on the desktop PC 110. When the tablet PC 120 is mounted to the desktop PC 110 and the mounting is detected at pin 126, the tablet PC 120 can request an identifier from the desktop PC 110 and retrieve a set of control permissions associated with the identifier of the desktop PC 110. If the desktop PC 110 contains a set of control permissions enabling selective control of the desktop PC 110 charging function through pins 127 in the mount 200, associated with an identifier of the tablet PC 120, then the tablet PC 120 can request that the desktop PC 110 charge the tablet PC 120. Once the tablet PC 120 determines that it is fully charged, the tablet PC 120 requests that the desktop PC 110 stop charging the tablet PC 120. FIG. 6D shows a front view of the tablet PC 120 being mounted into a mount 200 on the desktop PC 110 using the mount 125' in the open position.

Figure 7A:
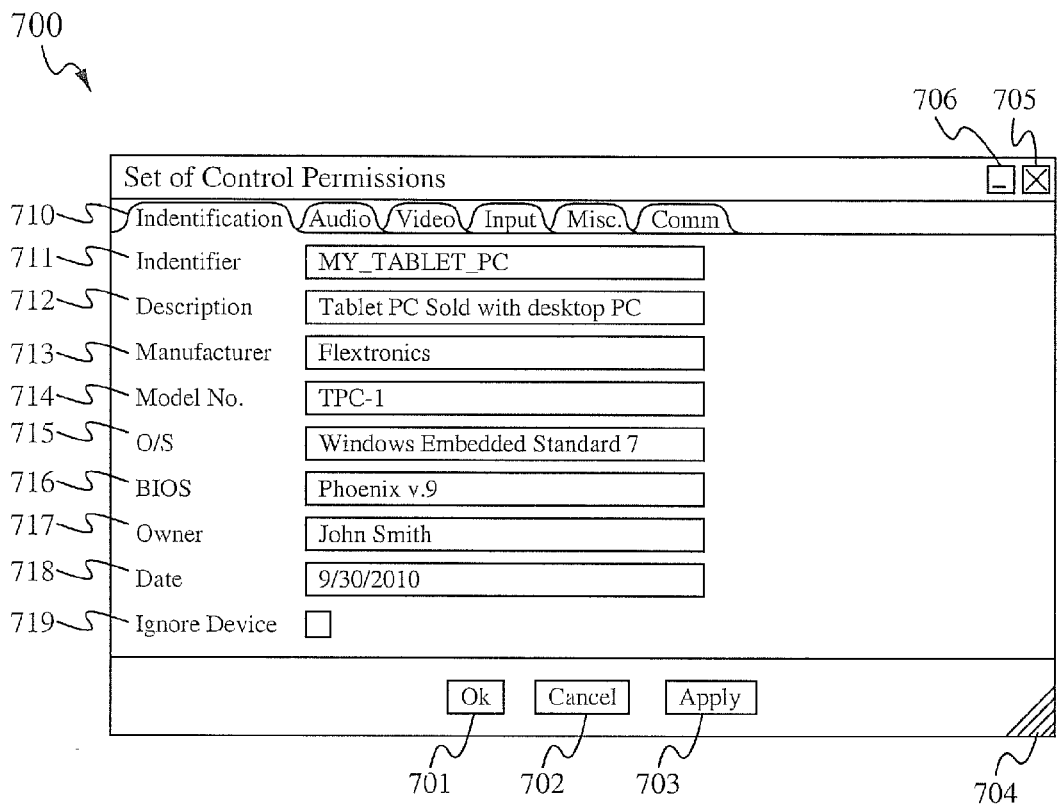
FIG. 7A shows the identification properties of a set of control permissions, according to some embodiments.

FIGS. 7A-7F show an embodiment of the properties of a set of control permissions for a detected and identified controlling device. FIG. 7A shows the identification properties of a set of control permissions associated with a detected controlling device having an identifier "MY_TABLET_PC" 711. A tabbed dialog box 700 of the properties of a set of control permissions can comprise an identification tab 710. The tabbed dialog box 700 can further comprise common controls such as an "OK" button 701, a "Cancel" button 702, an "Apply" button 703, a window sizing control 704, a close window control 705, and a window minimization control 706. These controls are common to the window, independent of the tab control currently displayed, as is known in the art. FIGS. 7A-7F describe the properties of the Set of Control Permissions for a controlling device having an identifier. If a controllable device does not possess a certain property, or group of properties, then the corresponding controls in the tabbed dialog boxes will appear grayed out, or inoperative. Inoperative controls can be set in software to not permit the any control of the property, or the controls can be automatically set to "no control" for the property. The identification tab 710 includes a field for an identifier 711 of the controlling device whose properties are described in the dialog box. The identifier can be typed in by a user, by a factory technician, or can be obtained from device information such as manufacturer, model number, serial number, or a combination of these. A description field 712 is a textual, human-readable field to describe the controlling device. Fields for the manufacturer 713, model number 714, operating system type and revision 715, and BIOS version 716 of the controlling device can be stored according to well-known techniques. Properties can further include the owner 717 of the controlling device, and the date 718 upon which the controlling device first became known to the controllable device. A global "ignore" flag 719 can be used to deny any control of the controllable device by the controlling device. Setting the "ignore" flag 719 can be used to automatically set all other properties fields to "no control", or can be used as an override flag to deny control by a controlling device without setting the individual control properties to "no control."

Figure 7B:
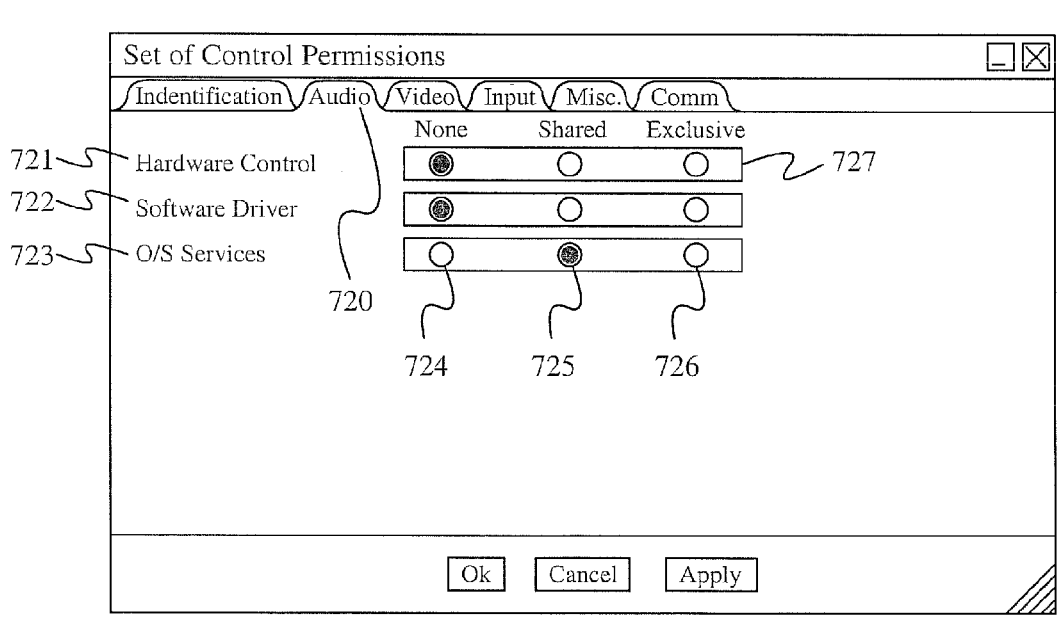
FIG. 7B shows the audio properties of a set of control permissions, according to some embodiments.

FIG. 7B shows the audio properties of a set of control permissions, according to some embodiments. The tabbed dialog box 700 can comprise an audio control permissions tab 720. Audio control permissions can include hardware level control 721, control of audio software driver functionality 722, and audio operating system services control 723. Each control can have a radio button corresponding to "no control" 724, "shared control" 725, or "exclusive control" 726. The settings in each group of radio buttons 727 for each property are mutually exclusive. If "none" is selected for a property, then "shared" and "exclusive" are de-selected, as is well-known in the art. Radio buttons can also be logically set by making a specific selection. For example, selecting "exclusive" hardware level control logically means that the software driver control 722 and the operating system services control 723 could be automatically set to "none." Selection of exclusive hardware control can be the best choice where high-bandwidth control is needed, such as for streaming video and audio from a desktop PC to a digital picture frame with audio properties.

Figure 7C:
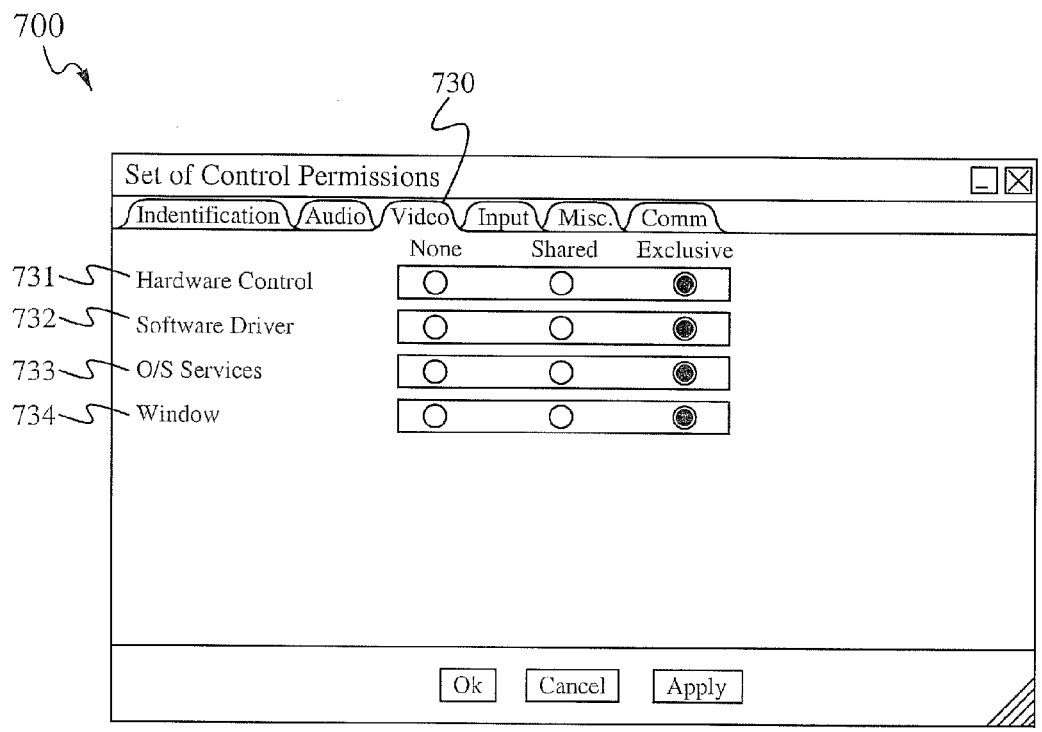
FIG. 7C shows the video properties of a set of control permissions, according to some embodiments.

FIG. 7C shows the video properties of a set of control permissions, according to some embodiments. The tabbed dialog box 700 can further comprise a video control permissions tab 730. Video control properties can include hardware level control 731, control of video software driver functionality 732, video operating system services control 723, and control over a specific window on a display 734.

Figure 7D:
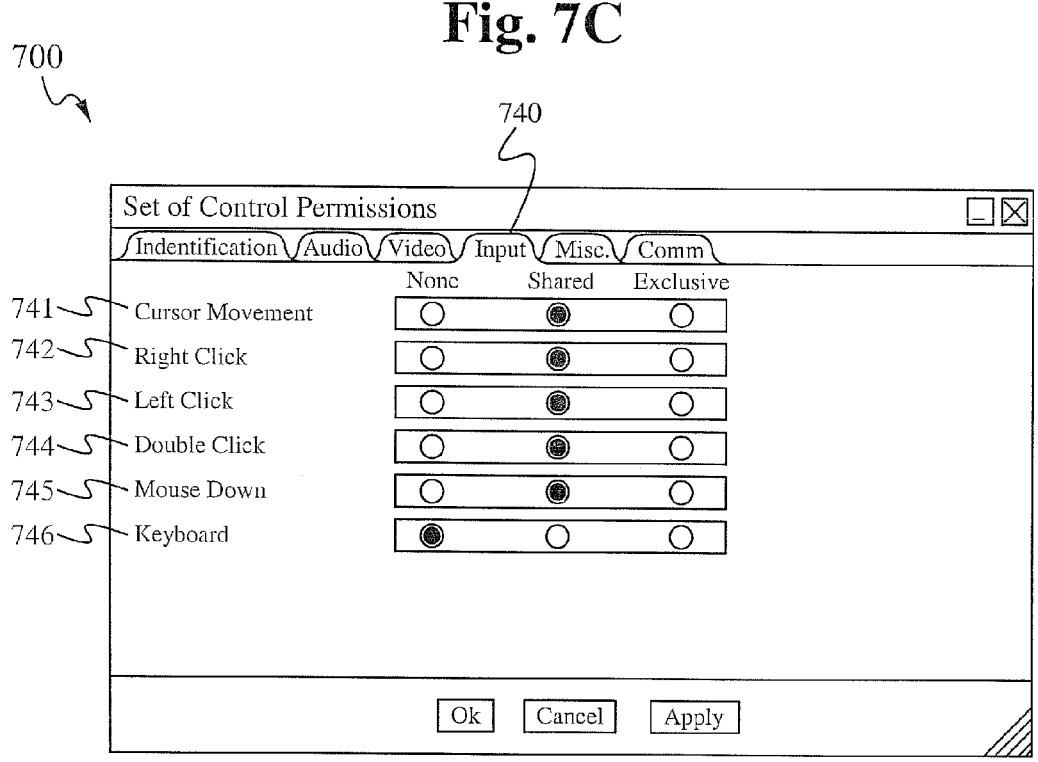
FIG. 7D shows the input properties of a set of control permissions, according to some embodiments.

FIG. 7D shows the input properties of a set of control permissions, according to some embodiments. The tabbed dialog box 700 can also comprise an input permissions table 740. Input control properties can include cursor movement 741, right-click events 742, left-click events 743, double-click events 744, mouse down events 745, and keyboard events 746. As described above, control can be "no control", "shared control", or "exclusive control." Configuration of the input control permissions, in conjunction with other permissions, can enable a "Gamer" mode where each player has an electronic device, and each electronic device permits some control by the other player's electronic device.

Figure 7E:
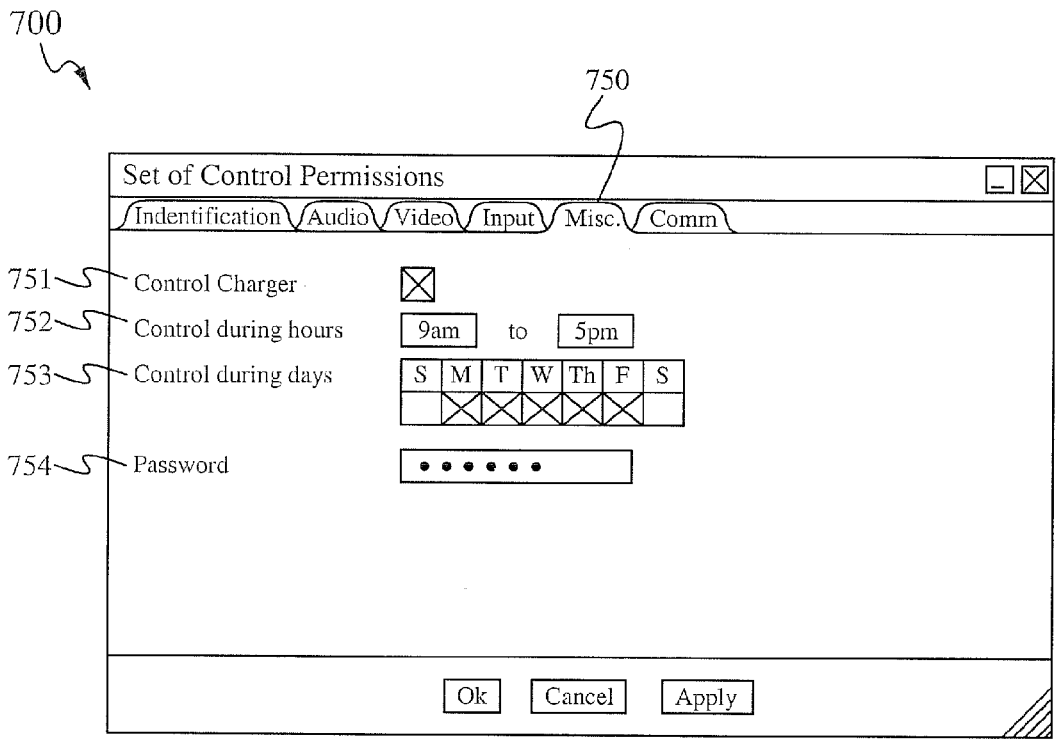
FIG. 7E shows the miscellaneous properties of a set of control permissions, according to some embodiments.

FIG. 7E shows the miscellaneous properties of a set of control permissions, according to some embodiments. The tabbed dialog box 700 can additionally comprise a check box 751 permitting the controlling device to charge the controlled device. The effective hours of permission can be limited to certain times 752 and certain days 753. A password can be required for a controlling device as a prerequisite to being permitted any control over the controllable device. The foregoing set of control permissions is exemplary and non-limiting. One skilled in the art can add to or delete from the set of control permissions.

Figure 7F:
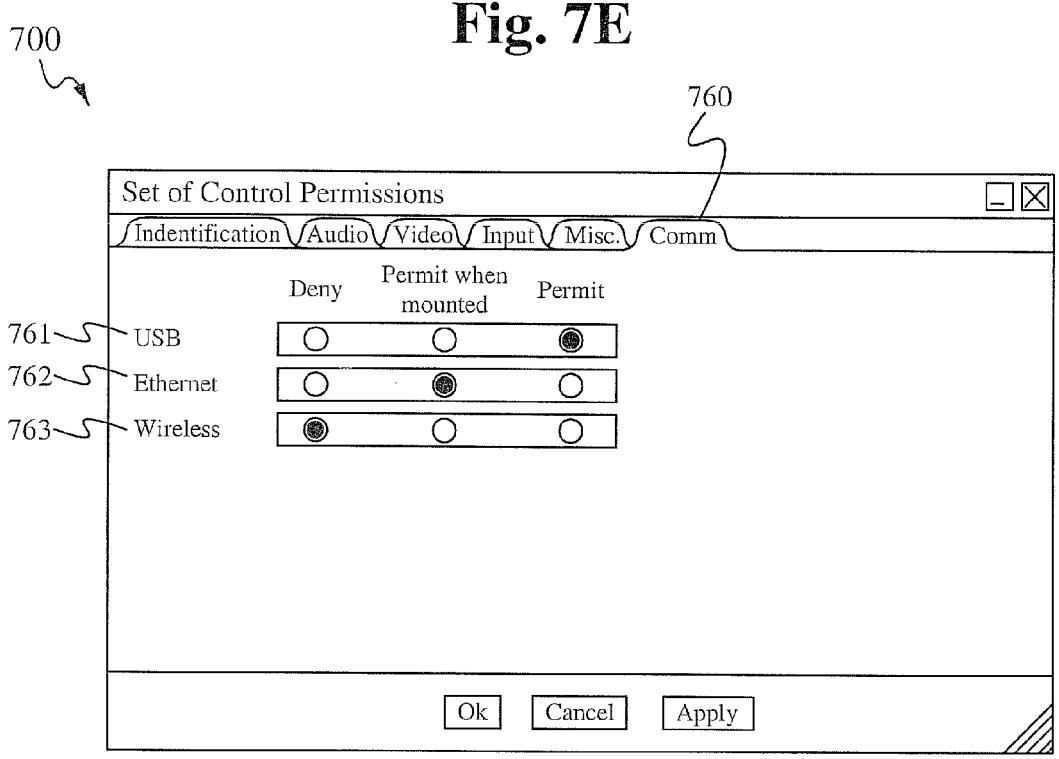
FIG. 7F shows the communication properties of a set of control permissions, according to some embodiments.

FIG. 7F shows the communication properties tab. The communications properties can be used to limit ways in which a controlling device is allowed to communicate with a controllable device. For example, a user choose not to permit any device to communicate with his desktop PC by wireless communication. Or, a user may limit communication with his desktop PC to only devices coupled to a mount on the PC.

Coupling of Devices

A first electronic device having a display ("controlled device") and a second electronic device having a display ("controlling device") can be coupled mechanically, electrically, communicatively, or by a combination of these. In a preferred embodiment, a desktop PC comprises a mount for detachably coupling the tablet PC to the desktop PC. Electronic devices can also be coupled electrically using a cable such a USB cable. The USB cable contains pins for DATA+, DATA−, $V_{CC}$ and Ground. Electronic devices can be communicatively coupled using any known communication means such as Ethernet, RS485, RS232, wireless, $I^2C$, clocked serial I/O, IEEE-1394 FireWire, USB or other communication protocol.

In a preferred embodiment, a user performs an initial, one time coupling that requires both devices to be under the physical control of the user. During this initial coupling, the two devices can each retrieve and store an identifier of the other device, thereby ensuring that the user can control which devices are permitted selective control of another one of the user's electronic devices. Such a requirement helps prevent unauthorized access or hacking by wireless devices which could communicatively couple to a user's device without the user's knowledge.

In some embodiments, a user may own a tablet PC, a desktop PC, and a digital picture frame. The user couples the desktop PC once to the tablet PC, and once to the digital picture frame. When coupled, the devices detect and identify one another as described below. The user then couples the tablet PC once to the digital picture frame. Thereafter, all three devices are known to one another, and coupling can be done wirelessly. In an alternative coupling process, when two devices are coupled together, each can learn the identifiers of all of the devices known to the other device.

Detecting a Controlling Device

In a preferred embodiment, a desktop PC includes a mount for detachably coupling a tablet PC to the desktop PC. The desktop PC can detect the tablet PC by including a detection means in the mount. A device can be detected by an electrical contact in the mount which makes or breaks a circuit. The mount can alternatively include a switch, such as a momentary switch, which is depressed when the tablet PC is mounted to the desktop PC and is released when the tablet PC is detached from the mount. The mount can alternatively include a sensor such as an optical sensor which detects an absence of light when the devices are coupled, or a magnetic "Hall Effect" sensor which detects a magnet in the tablet PC mount when the devices are mounted together. Instead of mounting, a controlling device can be detected by an electrical or communicative coupling of the tablet PC and the desktop PC. A controlling device can also be detected by a communicative coupling, such as by a wireless interface.

Identifying a Controlling Device

In a preferred embodiment, after the tablet PC is coupled to the desktop PC, the tablet PC initiates a communication session with the desktop PC. The communication session can begin with a request for the identifier of the desktop PC by the tablet PC. The desktop PC can respond with an identifier. Alternatively, a pattern of sensors, switches, or contacts similar to those described above for detection can be used to determine a hardware identifier of the tablet PC mounted to the desktop PC. In some embodiments, a set of three (3) contacts in the mount of the tablet PC and a set of three (3) corresponding pads inside the mount on the desktop PC, can be used to establish an identifier of a device based on a binary pattern sensed in the contacts and pads. Utilizing three contacts yields $2^3=8$ distinct electronic device identifiers, as is well-known in the art. Any number of address pins could be used to establish an identifier. Using a hardware identifier based on detection means in the mount has the benefit of aiding in the prevention of unauthorized requests for a set of permission controls via a wireless communication channel. One skilled in the art will recognize that the above-described means for detecting and identifying a controlling device could be combined into a single pair of communication contacts in the mount which would serve both the detection and identification functions.

Charging a Device

In a preferred embodiment, a desktop PC comprises a mount with detection and identification means as described above. The mount can further comprise a pair of pins applying a voltage to a corresponding set of pads on the mating tablet PC mount. Charging can also be accomplished via the $V_{CC}$ and ground pins on a USB cable. Alternatively, the tablet PC can couple a charging cable to a charging port on the desktop PC which applies a charging voltage to the tablet PC. A tablet PC is a controlling device having a rechargeable power supply. When the tablet PC is coupled to the desktop PC, the tablet PC is detected and identified by the desktop PC. A set of control permissions is retrieved and implemented for the tablet PC by the desktop PC. The tablet PC commands the desktop PC to charge the tablet PC. If the set of control permissions allows the tablet PC to control the desktop PC charging function, then the charging function is turned on by the desktop PC. When the tablet PC is charged, the tablet PC commands the desktop PC to stop charging the tablet PC.

Retrieving Control Permissions

Once a controlling device is detected and identified by the controllable device, the controllable device can retrieve and implement a set of control permissions associated with the identifier of the controlling device. In a preferred embodiment, the set of control permissions associated with an identifier of the controlling device can be stored on the controllable device. In a preferred embodiment, a controlling desktop PC is detected and identified by a controllable tablet PC. The tablet PC looks up the identifier of the desktop PC in a memory on the tablet PC. If the identifier is present in the tablet PC memory, then a corresponding set of control permissions associated with the identifier is retrieved and implemented on the tablet PC thereby enabling selective control of a resource on the tablet PC by the desktop PC. If the identifier of the desktop PC is not present on the tablet PC, then the tablet PC can create a default set of control permissions for the desktop PC and optionally can associate the identifier of the desktop PC with the set of control permissions, and store the control permissions. Alternatively, a user can edit the default set of control permissions associated with the identifier of the desktop PC, and store the control permissions. In some embodiments, the control permissions can be retrieved from a source accessible to the tablet PC. In addition, an electronic device manufacturer is able to create a default set of control permissions for a make and model of electronic device made by the manufacturer. The manufacturer can then make the default set of control permissions accessible to requesting controllable devices. In some embodiments, the manufacturer makes a default set of permissions for a make and model of their device available via the Internet. In some embodiments, persons other than the user or manufacturer of an electronic device can create and store a permission set for a particular use of an electronic device, and the permission set can be downloaded by the controllable device via the Internet. In still other embodiments, a set of control permissions associated with an identifier of the controlling device can be stored on, and retrieved from, the controlling device. Such an embodiment is particularly useful when a cooperative relationship is set up between two electronic devices with each device controlling a resource of the other electronic device. A set of control permissions for each device can be created and stored on both devices in order to quickly setup a cooperative relationship of permissions between the two devices.

Example Configurations

The following example configurations describe specific ways that a pair of electronic devices can interoperate in accordance with the presently-claimed invention. The examples are illustrative and are not intended to be limiting.

Dual Screen PC

In this configuration, a desktop PC is a controlling device coupled to a controllable digital picture frame having audio capabilities. The digital picture frame detects and identifies the desktop PC. A set of control permissions is retrieved from the digital picture frame memory and implemented on the digital picture frame. The set of control permissions enables the desktop PC to selectively control the display and audio features of the digital picture frame. A communication session is initiated between the desktop PC and the digital picture frame. The desktop PC requests exclusive use of the digital picture frame video and audio to play a movie. In some embodiments, the application playing the movie is running on the desktop PC, not on the digital picture frame. In some embodiments, the application playing the movie is running on the digital picture frame. The desktop PC transmits audio and video data to the picture frame, and the digital picture frame displays the video and plays the audio in accordance with the set of control permissions for the desktop PC.

Tablet PC Charger

In this configuration, a desktop PC with a mount having charging pins is a controllable device. A tablet PC is a controlling device. A user mounts the tablet PC to the desktop PC. The desktop PC detects and identifies the tablet PC, and retrieves a set of control permissions enabling selective control, by the tablet PC, of the desktop PC charging pins in the mount. A communication session is initiated between the devices. The tablet PC has a rechargeable power source. The tablet PC reads its own rechargeable power source level by well-known methods. If the power source level is below maximum, the tablet PC commands the desktop PC to turn on the charging function to the charging pins in the mount. When the tablet PC determines that its rechargeable power source level is at maximum, the tablet PC commands the desktop PC to turn off the charger pins in the mount. The tablet PC and the desktop PC are otherwise independently operable.

Remote Control of Desktop PC

In this configuration, a tablet PC can remotely control the inputs of a desktop PC, and the desktop PC can control the display of the tablet PC. In a preferred embodiment, the tablet PC and the desktop PC are coupled together a first time so that each device has detected and identified the other device, and each device has stored a set of control permissions associated with the identifier of the other device. Subsequently, the tablet PC and desktop PC each detect and identify the other by wireless communication. A set of control permissions associated with the identifier of the tablet PC is retrieved and implemented on the desktop PC. The set of control permissions enable the tablet PC to control inputs to the desktop PC. A set of control permissions associated with the desktop PC is retrieved and implemented on the tablet PC. The set of control permissions enable the desktop PC to control the tablet PC display. A chess game is running on the desktop PC. The tablet PC has a touch screen. The user of the tablet PC makes a hand movement on the touch screen of the tablet PC. The hand motion on the tablet PC produces a corresponding input movement on the desktop PC. The desktop PC is playing a chess game and processes the input as a chess move. The desktop PC updates its display to show the results of the chess move. The desktop PC updates the display of the tablet PC to match the display of the desktop PC. This gives the appearance that the chess game application is running on the tablet PC, when in fact the chess game is only running only on the desktop PC. The tablet PC is effectively being remotely controlled by the tablet PC. Using a second tablet PC and shared control of the desktop PC inputs between the first and second tablet PCs, two users could play chess on a desktop PC with a large screen, while sitting on a couch across the room from the desktop PC using their tablet PC's to take turns making chess moves on the desktop PC.

In operation, a method of enabling selective control a resource of an electronic device having a display begins with the electronic device, called the controllable device, detecting the presence of another device, called the controlling device. Detection of the controlling device can be by the devices being coupled together, such as by mounting the devices together, or by interconnecting them with a cable. Detection can also be by communicative, rather than physical, coupling. A controllable device can poll for the presence of any controlling devices on the communication channel. A controlling device can poll for the presence of controllable devices on the communication channel. When a controllable device detects the controlling device's poll, the controlling device has been detected by the controllable device. Once a controlling device is detected, a communication session is initiated between the devices. The controllable device requests, from the controlling device, an identifier associated with the controlling device. The controlling device furnishes an identifier to the controllable device via the communication channel. The identifier can be any identifier of the controlling device such as a serial number of the device, CPU ID, MAC address, an IP address, a user-defined name, or other identifier. The controllable device receives the identifier and looks it up to see whether the controlling device identifier is known to the controllable device. A controllable device can request more than one identifier from the controlling device, or a password, or other authentication from the controlling device. Such authentication can include the controllable device requesting answers to one or more security questions. A controllable device can also require that permission to implement a set of control permissions must be granted manually by a user of the controllable device, even if the identifier of the controlling device is known to the controllable device. If the identifier of the controlling device is not known to the controllable device, a default set of control permissions can be used. A default set of control permissions can specify that the controlling device is not permitted any control over the controllable device. The set of control permissions associated with the device identifier can be retrieved by looking them up in storage on the controllable device. The set of control permissions can also be retrieved by querying a server in communication with the controllable device. The set of control permissions can also be entered manually. Once the set of control permissions is established, the controlling device can request service from the controllable device in accordance with the set of control permissions. A request for service can be implemented under any method such as COM, DCOM, CORBA, WCF, RPC, or by launching an applet, an object, a process, or thread on the controllable device. The request for service can also be implemented using a proprietary communication protocol. A request can be fulfilled by the controllable device by passing the request to an operating system service, by calling a device driver function, or by interacting directly with the hardware of the controllable device. The implementation of the requested service can be also be an abstraction layer over any existing implementation for the device such that the service of requests for control in accordance with the set of control permissions is implemented as a device-specific agent residing on the controllable device. Control by a controlling device can be terminated in a variety of ways. A controllable device can terminate the control by a controlling device through a user explicitly terminating the control, by the expiration of a specified time or date window for control, by a user revoking a particular permission in set of control permissions, by a user powering off the controllable device, or by terminating communication with the controlling device. A controlling device can terminate control of the controllable device by terminating communications with the controllable device, by powering off of the controlling device, by sending a message to the controllable device requesting termination of control, or by not requesting any control of the controllable device.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made to the embodiments chosen for illustration without departing from the spirit and scope of the invention as defined by the appended claims.

What is claimed is:

1. A method of enabling selective control of a resource of an electronic device having a display comprising:

a) implementing, on the electronic device, a set of control permissions for a detected controlling device having a display, based on a type of the controlling device, wherein the electronic device includes a processor, a display, a communication module, an input device, and a memory programmed with instructions, wherein the controlling device includes a processor, a display, a communication module, an input device, a memory, and an identifier:

b) detecting the presence of the controlling device and retrieving the identifier of the controlling device by the electronic device; and c) retrieving a set of control permissions associated with the type of the controlling device, wherein the set of control permissions further enables selective control of a tablet computer audio by a desktop computer, wherein the electronic device comprises the tablet computer and the controlling device comprises the desktop computer.

2. The method of claim 1, wherein the resource is one of a video resource, an audio resource, an input resource, and a charging resource.

3. The method of claim 1, wherein the resource is the display on the electronic device, and the set of control permissions enables the controlling device to control the display on the electronic device.

4. The method of claim 1, wherein the resource is a charging resource on the electronic device, and the set of control permissions enables the controlling device to control the charging of the controlling device by the charging resource on the electronic device.

5. The method of claim 1, wherein the set of control permissions for the controlling device enables the controlling device to exclusively control a resource on the electronic device.

6. The method of claim 1, further comprising:
establishing, by a user of the electronic device, a set of control permissions for the controlling device.

7. The method of claim 1, further comprising:
retrieving a stored set of control permissions associated with the identifier of the controlling device.

8. The method of claim 1, wherein the enabling selective control of a resource of the electronic device is independent of an application running on the controlling device.

9. The method of claim 1, wherein the set of control permissions is associated with the type of the controlling device.

10. The method of claim 1, wherein the set of control permissions corresponds to a selective control mode.

11. The method of claim 10, wherein the selective control mode is one of an audio mode, an audio-visual mode, an input mode, and a charging mode.

12. The method of claim 10, wherein the selective control mode is implemented on the electronic device based on the identifier of the detected controlling device.

13. The method of claim 12, wherein audio-video selective control mode is implemented on the electronic device based on the identifier corresponding to a particular desktop computer controlling device.

14. The method of claim 1, wherein the controlling device is detected and identified a first time during a coupling the electronic device with the controlling device, and subsequently the controlling device is detected and identified by communicating with the electronic device.

15. The method of claim 1, further comprising:
terminating the selective control of the electronic device by the electronic device.

16. A non-transitory computer-readable medium programmed with instructions implementing a method of enabling, by an electronic device having a display, selective control of a resource of the electronic device comprising
implementing, on the electronic device, a set of control permissions for a detected controlling device based on a type of the controlling device, wherein the controlling device includes a processor, a display, a communication module, an input device, a memory, and an identifier;
detecting the presence of the controlling device and retrieving the identifier of the controlling device by the electronic device; and retrieving a set of control permissions associated with the type of the controlling device by the electronic device, wherein the set of control permissions further enables selective control of a tablet computer audio by a desktop computer, wherein the electronic device comprises the tablet computer and the controlling device comprises the desktop computer.

17. An electronic device comprising:
a. a processor;
b. a display;
c. an input device;
d. a communications module;
e. a computer-readable medium programmed with instructions for enabling selective control of a resource of the electronic device by implementing a set of control permissions on the electronic device for a detected controlling device having a display, based on a type of the controlling device, wherein the controlling device includes a processor, a display, a communication module, an input device, a memory, and an identifier;
f. a detector of the electronic device to detect the presence of the controlling device and to retrieve the identifier of the controlling device; and
g. a retriever of the electronic device to retrieve a set of control permissions associated with the type of the controlling device, wherein the set of control permissions further enables selective control of a tablet computer audio by a desktop computer, wherein the electronic device comprises the tablet computer and the controlling device comprises the desktop computer.

18. The electronic device of claim 17, further comprising a connecter coupling the electronic device with a controlling device.

19. The electronic device of claim 18, wherein the connecter further comprises a detector configured to detect the controlling device.

20. The electronic device of claim 18, further comprises an identifying device configured to identify the controlling device.

21. The electronic device of claim 18, further comprising a rechargeable power source.

22. A system comprising:
a first electronic device including a processor, a display, a communication module, an input device, and a memory programmed with instructions implementing a method of enabling, by the first electronic device, selective control of a resource of the first electronic device by a second electronic device in accordance with a set of control permissions associated with a type of the second electronic device;
wherein the second electronic device includes a processor, a display, a communication module, an input device, a memory, and an identifier;
a detector of the first electronic device to detect the presence of the second electronic device and to retrieve the identifier of the second electronic device; and
a retriever of the first electronic device to retrieve a set of control permissions associated with the type of the second electronic device, wherein the set of control permissions further enables selective control of a tablet computer audio by a desktop computer, wherein the first electronic device comprises the tablet computer and the second electronic device comprises the desktop computer.

23. The system of claim 22, wherein the first electronic device and the second electronic device are each independently operable from the other.

24. The system of claim 22, wherein the first electronic device is a tablet computer, the second electronic device is a desktop computer, detected and identified by the tablet computer, and the tablet computer implements the set of control permissions enabling selective control of the tablet computer display by the desktop computer.

25. The system of claim 22, wherein the first electronic device further comprises a charger for charging the second device, and the set of control permissions enable the second device to selectively control the charger for charging.

* * * * *